Oct. 21, 1941.　　　A. S. GARTHUS　　　2,260,018
BIRDHOUSE
Filed April 2, 1941
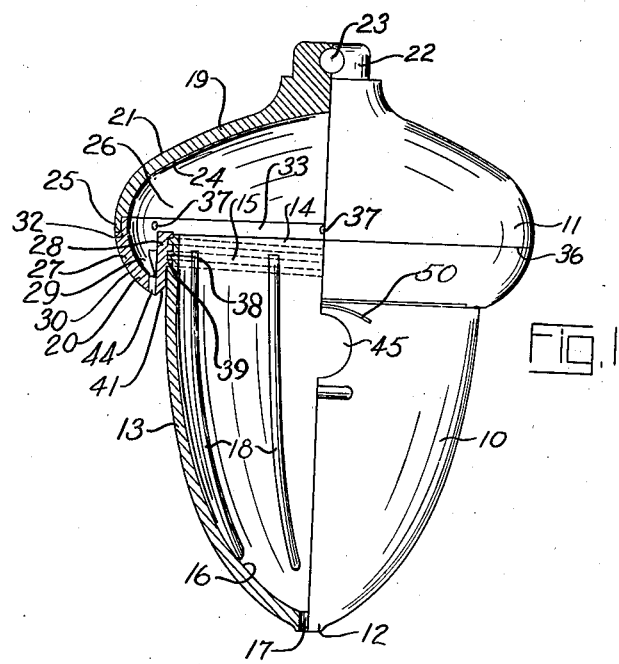
Fig.1
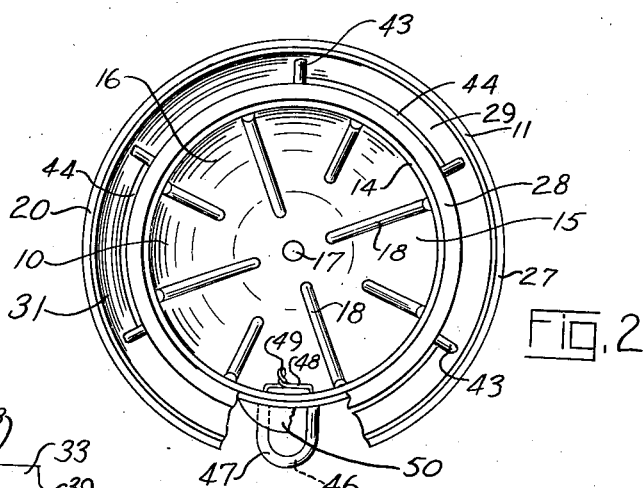
Fig.2
Fig.3
INVENTOR
ADAM S. GARTHUS
BY G. H. Braddock
ATTORNEY Patented Oct. 21, 1941

2,260,018

UNITED STATES PATENT OFFICE 2,260,018

BIRDHOUSE

Adam S. Garthus, Independence, Wis.

Application April 2, 1941, Serial No. 386,439

12 Claims. (Cl. 119—23)

This invention relates to a bird house, and the object of the invention is to provide a bird house incorporating several novel and improved features and characteristics of construction.

With the above object in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification:

Fig. 1 is a view, partially in side elevation and partially in vertical central section, of a bird house made according to the invention;

Fig. 2 is a top plan view, partially broken away, of the bird house with the upper part of the top or roof of said bird house omitted; and Fig. 3 is a detail sectional view of the lower part of the top or roof portion of said bird house.

With respect to the drawing and the numerals of reference thereon, the bird house here presented consists of two main elements, namely, a hollow body portion 10 and a hollow top or roof portion 11. Both said body portion 10 and said top or roof portion 11 desirably are composed of molded, plastic material.

The hollow body portion 10 as disclosed is of general conoidal conformation, or of general dome shape. The apex 12 of said hollow body portion is at the lower part thereof, and the continuous side wall 13 of the hollow body portion swells or domes outwardly and upwardly from said apex and terminates in a substantially annular band 14 of said hollow body portion at the upper part thereof defining an opening 15. The inner surface 16 of said side wall 13 is of curvilinear configuration and converges smoothly and evenly from the location of the annular band 14 to the location of the apex 12. A drain outlet at said apex is denoted 17, and spaced apart, vertically disposed strengthening or reinforcing ribs upon said inner surface 16 are indicated at 18. Said annular band 14 as shown is of uniform thickness.

The hollow top or roof portion 11 as disclosed is an inverted hollow member composed of two different pieces, viz., a continuous upper part 19 and a continuous lower part 20.

The outer, upper surface 21 of the upper part 19 of said hollow top or roof portion 11 is of curvilinear configuration and diverges smoothly and evenly downwardly and outwardly from a central protuberance 22 extending upwardly from said upper part 19 and including an aperture 23 through the medium of which the bird house can be supported. The inner, lower surface 24 of the upper part 19 is also of curvilinear configuration. Said upper part 19 of the hollow top or roof portion swells or domes outwardly and downwardly and terminates in a substantially annular band 25 defining an opening 26.

The lower part 20 of said hollow top or roof portion 11 is constituted as an annular trough like member consisting of an outer, annular wall 27 and an inner, annular wall 28 providing an annular space 29 between said outer and inner annular walls. The outer, lower surface 30 of the outer, annular wall 27 is of curvilinear configuration and diverges smoothly and evenly upwardly and outwardly from the lower end of the inner, annular wall 28, and the inner, upper surface 31 of said outer, annular wall 27 is also of curvilinear configuration. The outer, annular wall 27 swells or domes outwardly and upwardly and terminates in a substantially annular band 32 defining an opening 33. The inner, annular wall 28 is cylindrical, as are also the inner surface 34 and the outer surface 35 of said inner, annular wall 28.

The upper part 19 and the lower part 20 of the hollow top or roof portion 11 are adapted to be tightly, detachably fitted to each other, as at 36, to provide an overlapping joint between said parts 19 and 20, and rivets 37, or equivalent, which pass through both the annular bands 25 and 32, are desirably employed to insure the intended fixed relation of the separate parts of said hollow top or roof portion 11.

The annular band 14 of the hollow body portion 10 includes an external thread 38 at and adjacent to the upper end of said hollow body portion, and said inner surface 34 of the annular wall 28 of the top or roof portion 11 includes a thread 39, complemental to the thread 38, disposed at the interior of and at and adjacent to the lower, open end 40 of said top or roof portion. The hollow body portion 10 and the lower part 20 of the hollow top or roof portion 11 are removably secured to each other by interengagement of the complemental threads 38 and 39 so that the lower open part of the inner, annular wall 28 of said top or roof portion is in snug surrounding relation to the annular band 14 of said hollow body portion.

The construction and arrangement are such that should the annular band 14 of the hollow body portion 10, composed of molded, plastic material, become non-circular while the elements 10 and 11 are disassembled, said annular band 14 can be made circular by manual flexing, and readily and easily assembled with or into the hollow top or roof portion 11 while manually retained in circular condition. And, too, by reason of the fact that the hollow body portion 10 is composed of molded, plastic material, the annular band 14 when assembled with the inner, annular wall 28 of the hollow top or roof portion 11, as by turning the thread 38 into the thread 39, will be resiliently engaged with and against the inner surface 34 of said inner, annular wall 28.

The annular band 14 of said hollow body portion 10 of course could be snugly assembled with and retained in the inner, annular wall 28 of the lower part 20 of said hollow top or roof portion 11 in a manner other than disclosed, as by employment of a bayonet joint, for example.

The construction and arrangement are also such that the upper part 19 and the lower part 20 of the hollow top or roof portion can be readily and easily assembled together. That is, should either or both of the annular bands 25 and 32 become non-circular, said bands could be made circular by manual flexing to be fitted together when the parts 19 and 20 are composed of molded, plastic material.

The outer, upper curvilinear surface 21 of the upper part 19 of the hollow top or roof portion 11 merges at its lower extremity smoothly and evenly into the upper extremity of the outer, lower curvilinear surface 30 of the outer, annular wall 27. Said outer, lower surface 30 converges smoothly and evenly downwardly and inwardly, and the lower circular open end of the inner, annular wall 28 slants inwardly and upwardly to define a bevel surface 41 which extends from the location of the lower edge or margin 42 of the outer, lower surface 30 to the location of the inner surface 34. That is, the lower end of the inner, annular wall 28 is cut to slant inwardly and upwardly to provide, together with the surfaces 21 and 30, an effective water drip for the bird house. It will be seen that inasmuch as the hollow body portion and the hollow top or roof portion are snugly fitted together, and the outer surfaces of the top or roof portion are constructed to direct water to the edge 42 which defines the lower margin of the curvilinear surface 30 as well as the outer, lower margin of the bevel surface 41, no water possibly can enter the bird house at the location of the detachable connection provided by the complemental threads 38 and 39. Instead, rain water will remove itself from the bird house by gravity from the location of said lower edge or margin 42.

The lower part 20 of the top or roof portion 11 is desirably fitted into the upper part 19 of said top or roof portion, and said parts 19 and 20 engage each other tightly so that no rain water possibly can enter the bird house at the location of the joint between the annular bands 25 and 32.

Said lower part 20 of said top or roof portion 11 includes spaced apart stiffening webs or ribs 43 disposed in the annular space 29. More explicity, said stiffening webs or ribs are integral with both the outer, annular wall 27 and the inner, annular wall 28 of the lower part 20 and span the distance between said walls. As disclosed, the stiffening webs or ribs 43 are in equally spaced relation. In addition to rendering the lower part 20 of said top or roof portion 11 more rigid than it otherwise would be, said webs or ribs 43 make provision for the use of a spanner type wrench to the purpose of screwing said lower part 20, after it has been formed in a mold, out of the mold. It of course will be understood that upon completion of molding of the lower part 20, the thread 39 on the inner surface 34 of the inner, annular wall 28 of said lower part will be engaged with a complemental thread of the mold, and by application of a suitable wrench to the webs or ribs 43 the formed lower part can be readily and easily screwed out of the mold.

Ventilating slots 44 for the bird house are disposed at the location of the meeting of the inner and outer annular walls 28 and 27 of the lower part of the top or roof portion and between adjacent stiffening webs or ribs 43. Ventilation by employment of the slots 44 at the locations disclosed avoids direct draft through the bird house. Evidently, no rain water can enter the bird house by way of the ventilating slots. As shown, the lower ends of said slots 44 are contiguous with the lower edge or margin 42, and there are fewer ventilating slots than webs or ribs 43. That is, if there is a ventilating slot between an adjacent pair of ribs, there preferably is no ventilating slot between the next adjacent pair of webs or ribs. The number of ventilating slots included will be a matter of choice.

Inasmuch as the continuous side wall 13 of the hollow body portion 10 converges smoothly and evenly to the location of the drain outlet 17 at the apex 12, moisture which might in some instances enter the bird house will flow out readily by way of said drain outlet.

An ingress and egress opening for birds in the hollow body portion 10 is represented at 45.

A perch for birds, situated beneath the opening 45, consists of a length of wire 46 the central part of which is covered with flexible material 47. The wire and its covered part constitute the perch proper, and the uncovered end portions 48 of the wire constitute means for securing the perch to the bird house. More explicitly, the wire and its flexible material cover are bent in the form of a loop, the uncovered end portions 48 of the wire are inserted through holes in the hollow body 10 so that the opposite end portions of the flexible cover material 47 are up against the outer surface of said hollow body portion and said uncovered end portions of the wire are fastened together, as by twisting at 49, at the interior of the bird house in such manner as to retain said opposite end portions of the flexible material constituting the covering for the wire against said body portion thus to cause the perch to be rigidly supported.

A shield 50 over the ingress and egress opening 45 is for the purpose of precluding the passage of rain water which may drip from the roof into the interior of the bird house through said opening 45. The upper portion of the body 10 could have vent openings each protected by a shield.

What is claimed is:

1. A bird house comprising a hollow body portion, a hollow roof portion having a lower part thereof in snug surrounding relation to an upper part of said hollow body portion and an upper part thereof constituted as a piece of material separate from the lower part, said lower part of said hollow roof portion being constituted as a trough like member composed of an outer, annular wall and an inner, annular wall in spaced relation to each other providing an annular space between said outer and inner walls, and means detachably securing said hollow body portion in said inner, annular wall of said lower part of said hollow roof portion, one of said portions having an opening for ingress and egress of birds, 2. A bird house comprising a hollow body portion, a hollow roof portion consisting of upper and lower parts constituted as separate pieces of material, said lower part of said hollow roof portion being constituted as a trough like member composed of an outer, annular wall and an inner, annular wall in spaced relation to each other providing an annular space between said outer and inner annular walls, said upper part of the hollow roof portion being joined to the outer, annular wall of said lower part of said hollow roof portion and the inner, annular wall of the lower part of the hollow roof portion being in surrounding relation to an upper part of said hollow body portion, and means detachably securing said hollow body portion in said inner, annular wall of said lower part of the hollow roof portion, one of said hollow portions having an opening for ingress and egress of birds.

3. A bird house comprising a hollow body portion including an upper, open part thereof composed of resilient material, a hollow roof portion consisting of upper and lower parts constituted as separate pieces of material, said lower part of said hollow roof portion being constituted as an annular trough like member composed of an outer, annular wall and an inner, annular wall connected to each other to provide an annular space between said outer and inner annular walls, said upper part of the hollow roof portion being in surrounding joined relation to the outer, annular wall of said lower part of said hollow roof portion and the inner, annular wall of the lower part of the hollow roof portion being in surrounding relation to an upper part of said hollow body portion, and means detachably securing said upper, open part of said hollow body portion within the inner, annular wall of the lower part of said hollow roof portion, one of said portions being provided with an ingress and egress opening for birds.

4. A bird house comprising a hollow body portion, a hollow roof portion consisting of upper and lower parts constituted as separate pieces of material, said lower part of said hollow roof portion being constituted as an annular trough like member composed of an outer, annular wall and an inner, annular wall connected to each other to provide an annular space between said outer and inner annular walls, said upper part of the hollow roof portion being in surrounding joined relation to the outer, annular wall of said lower part of said hollow roof portion and the inner, annular wall of the lower part of the hollow roof portion being in surrounding relation to an upper part of said hollow body portion, and means constituted as complemental threads upon said hollow body portion and said inner, annular wall of said lower part of said hollow roof portion, respectively, detachably securing said hollow body portion in said hollow roof portion, one of said portions having an opening for ingress and egress for birds.

5. A bird house comprising a hollow body portion including an upper, open part thereof composed of resilient material, a hollow roof portion consisting of upper and lower parts constituted as separate pieces of material, said lower part of said hollow roof portion being constituted as an annular trough like member composed of an outer, annular wall and an inner, annular wall connected to each other to provide an annular space between said outer and inner annular walls, said upper part of the hollow roof portion being in surrounding joined relation to the outer, annular wall of said lower part of said hollow roof portion and the inner, annular wall of the lower part of the hollow roof portion being in surrounding relation to an upper part of said hollow body portion, and means constituted as complemental threads upon said upper, open part of said hollow body portion and said inner, annular wall of said lower part of said hollow roof portion, respectively, detachably securing said hollow body portion and said hollow roof portion to each other, one of said hollow portions being provided with an ingress and egress opening for birds.

6. The combination as specified in claim 2, and webs in said annular space and rigid with said lower part of said hollow roof portion.

7. The combination as specified in claim 2, stiffening webs in said annular space and rigid with said lower part of said hollow roof portion, and ventilating slots through said lower part and disposed between said stiffening webs.

8. The combination as specified in claim 4, and stiffening webs in said annular space and rigid with said lower part of said hollow roof portion.

9. The combination as specified in claim 4, spaced apart stiffening webs in said annular space and rigid with said lower part of said hollow roof portion, and ventilating slots through said lower part and disposed between said stiffening webs and said outer and inner annular walls.

10. A bird house comprising a hollow body portion having an upper, open part, a hollow roof portion constituted as an inverted hollow member consisting of upper and lower parts constituted as separate pieces of material, said lower part of said hollow roof portion being constituted as an annular trough like member composed of an outer, annular wall and an inner, annular wall connected to each other to provide an annular space between said outer and inner annular walls, said upper part of the hollow roof portion being in surrounding joined relation to the outer, annular wall of said lower part of said hollow roof portion and the inner, annular wall of the lower part of the hollow roof portion being in surrounding relation to the upper, open part of said hollow body portion, and means detachably securing said upper, open part of said hollow body portion within the inner, annular wall of the lower part of said hollow roof portion, the lower part of the outer surface of the outer, annular wall of said hollow roof portion converging downwardly and inwardly, the lower end of said inner, annular wall slanting inwardly and upwardly, and one of said hollow portions having an opening for ingress and egress of birds.

11. In a bird house, a hollow roof portion constituted as an inverted hollow member consisting of upper and lower parts, said lower part of said hollow roof portion being constituted as an annular trough like member composed of an outer, annular wall and an inner, annular wall connected to each other to provide an annular space between said outer and inner annular walls, said upper part of the hollow roof portion being in united relation to the outer, annular wall of said lower part of said hollow roof portion and the inner, annular wall of the lower part of the hollow roof portion being adapted to surroundingly support a hollow body portion of said bird house.

12. The combination as specified in claim 11, and spaced apart webs in said annular space and rigid with said lower part of said hollow roof portion.

ADAM S. GARTHUS.